July 5, 1966  J. E. GRIMM III  3,259,050
AIR MODIFYING SYSTEM FOR VEHICLES
Filed Oct. 31, 1963  2 Sheets-Sheet 1

INVENTOR
JOHN E. GRIMM, III

BY *Strauch, Nolan & Neale*
ATTORNEYS

INVENTOR
JOHN E. GRIMM, III
BY *Strauch, Nolan & Neale*
ATTORNEYS

United States Patent Office 3,259,050
Patented July 5, 1966

3,259,050
AIR MODIFYING SYSTEM FOR VEHICLES
John E. Grimm III, New York, N.Y., assignor to Colgate-Palmolive Company, New York, N.Y., a corporation of Delaware
Filed Oct. 31, 1963, Ser. No. 320,315
6 Claims. (Cl. 98—2)

This invention relates to a system for conditioning, for example introducing deodorant or the like into, the air within a vehicle and is particularly concerned with special conditioning fluid supply, spray, conduit and associated control arrangements in the vehicle.

In its preferred embodiment the invention will be described as adapted for spraying a deodorant, perfume, medicated compositions or other air modifier into the usual passenger automobile. It can equally well be adapted to buses, street cars, railroad cars, planes and the like. It can be used in non-pressurized airplane or buses for injecting oxygen into the interior at selected intervals during travel at altitudes in excess of six thousand feet or so.

In essence the invention consists of a supply of air modifier fluid, and means for selectively discharging or drawing out some of it for admixture with air being supplied to a passenger compartment in a vehicle. The fluid is either sprayed into the air, or is picked up by the air and sprayed into the compartment or both. In any event the fluid is substantially uniformly spray mixed with the air supplied to the compartment.

It is therefore the major object of the present invention to provide a novel system for selectively introducing a conditioning fluid, such as deodorant, perfume, oxygen, medicaments or the like, into air being supplied to a vehicle passenger compartment or interior.

Another object of the invention is to provide a novel associated air modifier supply and distribution arrangement with selective control in a passenger vehicle.

A further object of the invention is to provide a novel air conditioning system for a passenger vehicle wherein air drawn into the vehicle receives a charge of deodorant or like air modifier and an intimate mixture thereof is discharged into the passenger compartment.

It is another object of the invention to provide in a vehicle having a built-in air conduit system novel means for selectively introducing charges of air modifier into the system. This means may take the form of a pressurized container such as the known aerosol can, or the liquid contents of a container may be aspirated, pumped or similarly drawn out into the air stream in the conduit system. Further to this object the conduit system may be the usual outside air introduction system of some automobiles, or it may be the heating and cooling conduit system of more recent automobiles.

A further object of the invention is to provide in a vehicle having a built-in conduit system for distributing air into the interior of a vehicle novel means for mounting a container of pressurized fluid with its discharge nozzle within the conduit system and provided with a manual control arrangement for selectively actuating the container to discharge its contents into the system.

Further objects of the invention will appear as the description proceeds in connection with the appended claims and the annexed drawings wherein:

Figure 1:
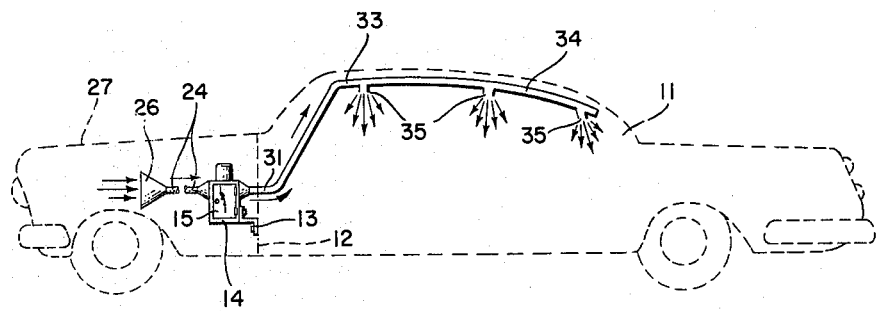
FIGURE 1 is a diagrammatic view showing a preferred embodiment of the invention as applied to a conventional passenger automobile.
Figure 2:
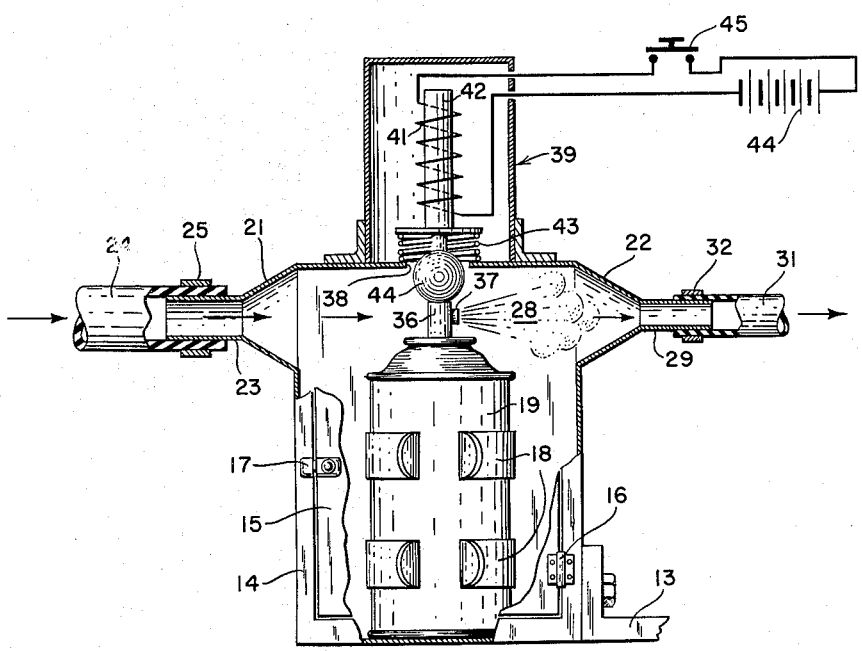
FIGURE 2 is an enlarged fragmentary elevation partly in section showing the container mounting and controls for one form of air conditioning system of FIGURE 1.

Referring to FIGURES 1 and 2, the invention is shown as incorporated into an automobile body 11 of more or less conventional design. On the front of the dashboard indicated at 12 in FIGURE 1 is secured a bracket 13 which supports a housing 14 having an openable side door 15 provided at opposite sides with hinges 16 and a latch 17.

Extending from the rear wall of housing 14 are a pair of spring clips 18 sized to received and hold a container 19 which otherwise rests on the bottom housing wall of the housing. Preferably housing 14 is of such structure as to insulate the container from heat of the vehicle engine.

Housing 14, when door 15 is shut, entirely encloses the container except for opposed air passage conduits 21 and 22 opening into the upper front and rear housing walls. Air intake conduit 21 reduces to a fitting 23 receiving one end of a flexible conduit 24. A pipe clamp 25 secures conduit 24 on fitting 23. At its forward end conduit 24 is attached to a suitable wide mouth air scoop 26 shown diagrammatically in FIGURE 1.

Scoop 26 is of funnel shape adapted to collect cool air that has passed through a suitable opening in the automobile engine hood 27, and this air flows into the space 28 in the upper part of housing 14 when the automobile is moving forwardly. Space 28 is thus essentially part of the air conduit system. Any suitable front or side opening in the automobile hood may be used to pass air to scoop 26, depending on the type of automobile construction. Scoop 26 is usually secured to the radiator or other relatively fixed part of the chassis.

Air discharge conduit 22 terminates in a fitting 29 receiving one end of a flexible conduit 31 surrounded by pipe clamp 32. Conduit 31 extends through the dashboard and up to the roof of the body where it is joined at 33 to a spray system consisting of a pipe 34 having a series of spray or like discharge heads 35.

Conduit 31 is partly hidden by body structure near the dashboard and preferably extends up through the hollow front body post at either corner. The pipe 34 is fixed to the roof frame above the usual decorative interior covering, and the spray heads 35 are multiple openings usually flush with the roof covering that deliver air from pipe 34 into the body interior. Thus the conduit system conveying air to spray heads 35 is usually concealed in the body structure.

The air conduit system may be for example optionally the built-in air vent and ventilation system supplied in nearly every standard automobile today.

Referring to FIGURE 2, the container 19 is preferably of the usual aerosol type containing fluid under pressure which when the flow control cap 36 is depressed toward the container discharges a spray of the contents through its nozzle 37. The container dimensions are such that container nozzle 37 sprays into the space 28 at about the level of the associated air conduits and in the direction of air flow.

Preferably container 19 is of the type shown in U.S. Letters Patent No. 2,631,814, issued March 17, 1953, to Ablanalp, to which reference is made for detail.

For selectively discharging contents of container 19 into the interior of the automobile body, the invention contemplates a manual control such as shown in FIGURE 2. Here the upper wall of housing 14 has an opening 38 covered by an electromagnet assembly 39 of more or less conventional structure and consisting of a coil 41 and a movable plunger 42. Plunger 42 when coil 41 is not energized is normally spring biased upwardly at 43 to a position where its head 44 is located just above container cap 36.

Coil 41 is in series electrical circuit with the usual car battery 40, and a normally open switch 45 which is suitably located on the dashboard within the body in front of the driver. When switch 45 is closed, coil 41 is energized to project plunger 42 downwardly to engage and depress cap 36 sufficiently to discharge some of the contents of container 19 into space 28 where the liquid spray is picked up and uniformly mixed with air flowing through conduit 24, space 28, conduit 31 and pipe 34 to discharge through heads 35 into the interior of the body. While spray heads 35 further admix the air freshener and incoming air their main function may be distribution to all regions within the body compartment.

The material discharged from container 19 may be any deodorant or air freshener, and as stated container 19 may even be an oxygen cartridge for high altitude driving comfort. In any event discharge heads 35 are usually so located and designed as to insure complete distribution of a spray mixture within the interior of the body.

Figure 3:
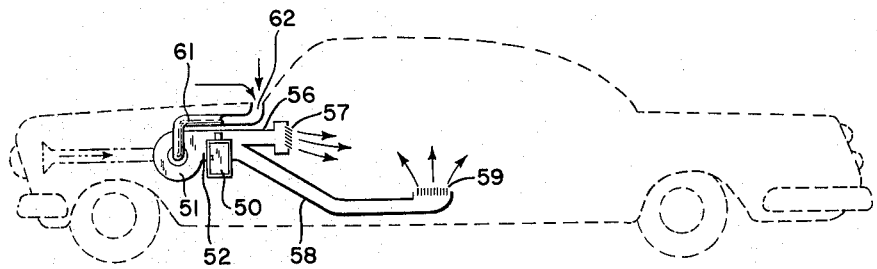
FIGURE 3 is another diagrammatic view showing another embodiment of the invention wherein the automobile has a heating and/or cooling system.
Figure 4:
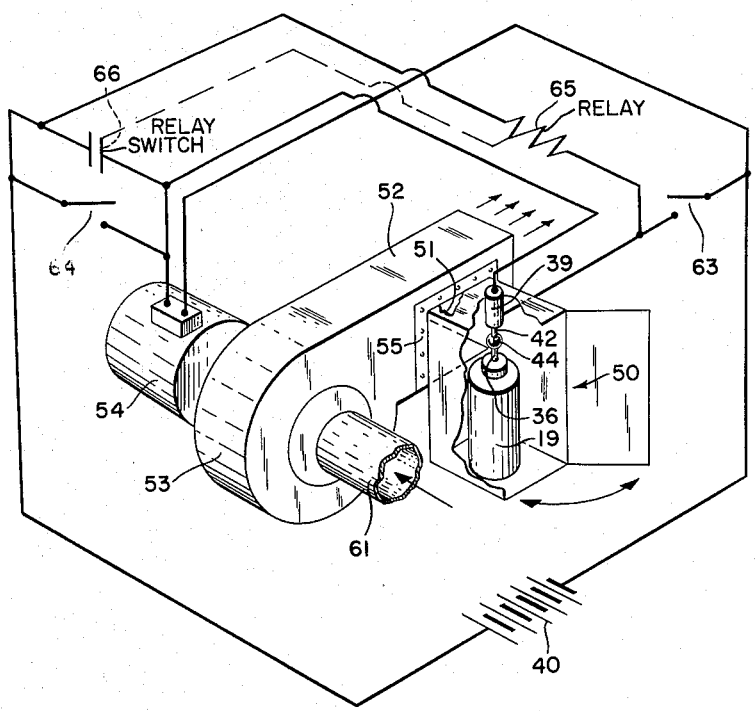
FIGURE 4 is an enlarged fragmentary elevation mainly diagrammatic showing mounting and controls for the container in the form of air conditioning system shown in FIGURE 3.

FIGURES 3 and 4 show the invention as applied to the air conditioning system of some modern automobiles wherein hot or cold air at the selection of the operator may be blown into the interior of the body through a conventional built-in conduit system.

In this embodiment the housing 50 encloses the conventional deodorant or like container 19 as in FIGURE 1, but instead of an air scoop and discharge arrangement, the inner side wall of the housing opposite the door is formed with an opening coextensive with an opening 51 cut into the side wall of the existing discharge conduit 52 leading from a blower 53 driven by electric motor 54. In this embodiment container 19 is oriented so that nozzle 36 may discharge spray toward opening 51.

Container 19 is here removably mounted in housing 50 similarly to the arrangement in FIGURE 1, but housing 50 is supported from sheet metal conduit 52 as by flanges 55 screwed or riveted to conduit 52 around opening 51, and conduit 52 is suitably fixed to the dashboard.

As shown in FIGURE 3, conduit 52 separates rearwardly into a branch conduit 56 leading to a register 57 on the dashboard, and a branch conduit 58 leading to an underseat or between seat register 59. The blower air intake conduit 61 is connected preferably to existing air intake louvres 62 located near the juncture of the windshield and body as in so many modern cars, but may be otherwise suitably located for the purpose.

The embodiment of FIGURES 3 and 4 includes the same electromagnet assembly 39 with spring biased plunger 42 as in FIGURES 1 and 2 and in electrical circuit with the usual battery 40. The magnet circuit is controlled by normally open switch 63. The blower motor circuit is controlled by a normally open manual switch 64 which enables the conventional air conditioning system to be continuously actuated while switch 63 remains closed.

While the conventional air conditioning system is in operation with switch 64 closed, the vehicle operator may introduce a charge of air modifier into conduit 50 merely by pressing the button for closing switch 63, and the resultant charge of deodorant is carried into the interior of the vehicle mixing with the air in the air conditioning system.

It may be desired to modify the interior of the automobile of FIGURES 3 and 4 while the conventional air conditioning system is not in operation and switch 64 is open. This can be accomplished merely by closing switch 63 in the FIGURE 4 arrangement whereby a circuit is established to magnet 39 to discharge container 19, and at the same time a relay 65 actuating normally open switch contacts 66 in the circuit of motor 54 will close switch contacts 66 for a predetermined interval to start and maintain operation of blower 53 long enough to supply at least enough modified air to renew the air within the automobile. Relay 65 will hold the blower in temporary operation even when the operator opens switch 63.

While, in both embodiments, the supply of air modifier has been disclosed as preferably a conventional pressurized container, which can be readily removed and replaced by a fresh container, it is within the spirit of the invention to use any other manner of discharging or drawing the container contents into the conduit system. For example the plunger 42 could operate a reciprocable pump in the top of a standard type non-pressurized liquid could be open to a restricted part of the conduit system within space 28 to effect withdrawal of the deodorant by a venturi or aspirating effect. Moreover the electromagnet could operate a squeeze bottle type container to discharge into the conduit system. All of these and equivalent modes of operation are referred to in the claims as means for introducing air conditioning fluid into the air conduit system.

Also the means for discharging the container could be powered by vacuum originating in a connection to the intake manifold, a source of compressed air, or a source of hydraulic fluid under pressure all deriving their energy from the engine of the vehicle in a conventional manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an automobile having an enclosed body containing a built-in air conditioning system comprising means defining an air intake member positioned at the forward portion of said automobile and a conduit system extending from said member into the body and having a plurality of air discharge outlets into the interior of said body, the improvement comprising means for supporting a container of pressurized air modifying medium in said vehicle with a normally closed control nozzle disposed for discharging said medium into the air stream flowing through said conduit system, and power operated means under control of the operator for selectively actuating said control nozzle.

2. In an automotive vehicle of the type having a source of power, an enclosed body and a built-in air conditioning system comprising a blower selectively connected to said source of power to propel air at a variable temperature through conduit means having a discharge outlet within said body, the improvement that comprises mounting a container of pressurized air modifier with its discharge nozzle arranged to introduce said air modifier directly into the air stream in said conduit means, and means selectively energized from said source of power for actuating said container to discharge said air modifier into the air stream including a manual control device at the operator's station within the vehicle body.

3. In the automotive vehicle defined in claim 2, a housing for said container mounted on said conduit means adjacent the blower outlet, and coextensive openings in said housing and conduit means for passage of said air modifier.

4. In the automotive vehicle defined in claim 2, said container being of the aerosol type with a depressible discharge nozzle assembly, and said means for actuating said container comprising a plunger driven to depress said nozzle when said means is energized.

5. In an automobile having an enclosed body containing a built-in air conditioning system comprising means defining an air intake member positioned at the forward portion of said automobile and conduit means extending from said member into said body and having a plurality of discharge outlets within the interior of said body, means removably mounting a container of pressurized air modifying medium in the automobile with a control nozzle disposed to discharge said medium directly into the air stream within said conduit means, electromagnetic means operably connected to actuate said control nozzle, and an electrical control circuit for said electromagnetic means having an operator controlled actuating switch for selective discharge of said medium into the air in said air conditioning system.

6. In an automobile having an enclosed body containing a built-in air conditioning system comprising conduit means having a plurality of discharge outlets within said body, means removably mounting a container of pressurized air modifying medium in the automobile with a control nozzle disposed to discharge said medium directly into the air stream within said conduit means, electromagnetic means operably connected to actuate said control nozzle, an electrical control circuit for said electromagnetic means having an operator controlled actuating switch for selective discharge of said medium into the air in said air conditioning system, a motor driven blower in said system for forcing air through said conduit means, said motor having an energizing circuit having a control switch, and means automatically effective to energize the motor circuit for at least a predetermined period even when said motor control switch is open upon actuation of said actuating switch for said electromagnetic means.

References Cited by the Examiner
UNITED STATES PATENTS

| | | |
|---|---|---|
| 2,523,923 | 10/1950 | Rodert. |
| 2,634,112 | 4/1953 | Snow. |
| 2,648,272 | 8/1953 | Norton. |
| 3,158,081 | 11/1964 | Frost _____ 98—30 |

MEYER PERLIN, *Primary Examiner.*